Figure 1:
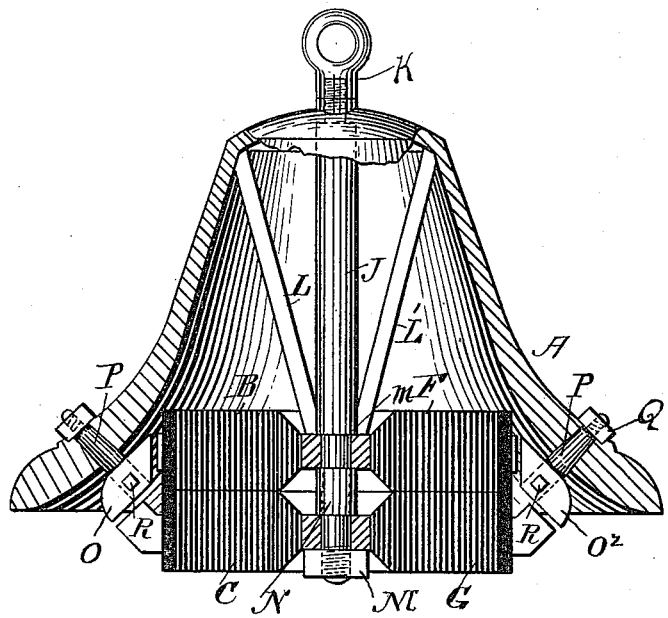

No. 636,519. Patented Nov. 7, 1899.
E. GRAY & A. J. MUNDY.
TRANSMISSION OF SOUND.
(Application filed Apr. 14, 1899.)

(No Model.) 3 Sheets—Sheet 1.

WITNESSES
K. T. Butler
J. M. Dolan

INVENTORS
Elisha Gray
Arthur J. Mundy
by their atty
Clarke & Raymond

No. 636,519. Patented Nov. 7, 1899.
E. GRAY & A. J. MUNDY.
TRANSMISSION OF SOUND.
(Application filed Apr. 14, 1899.)
(No Model.) 3 Sheets—Sheet 2.
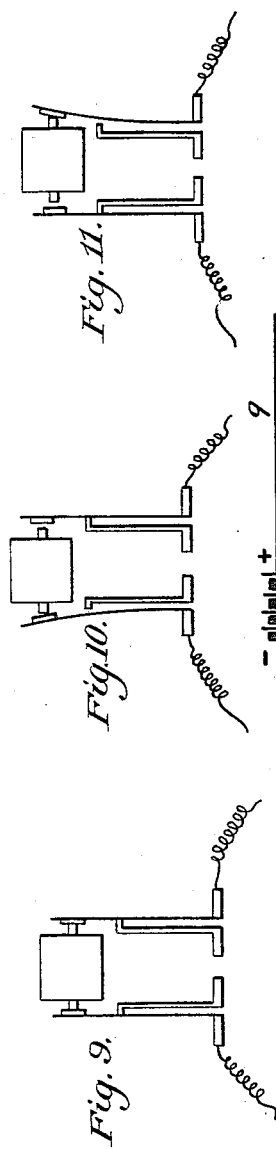
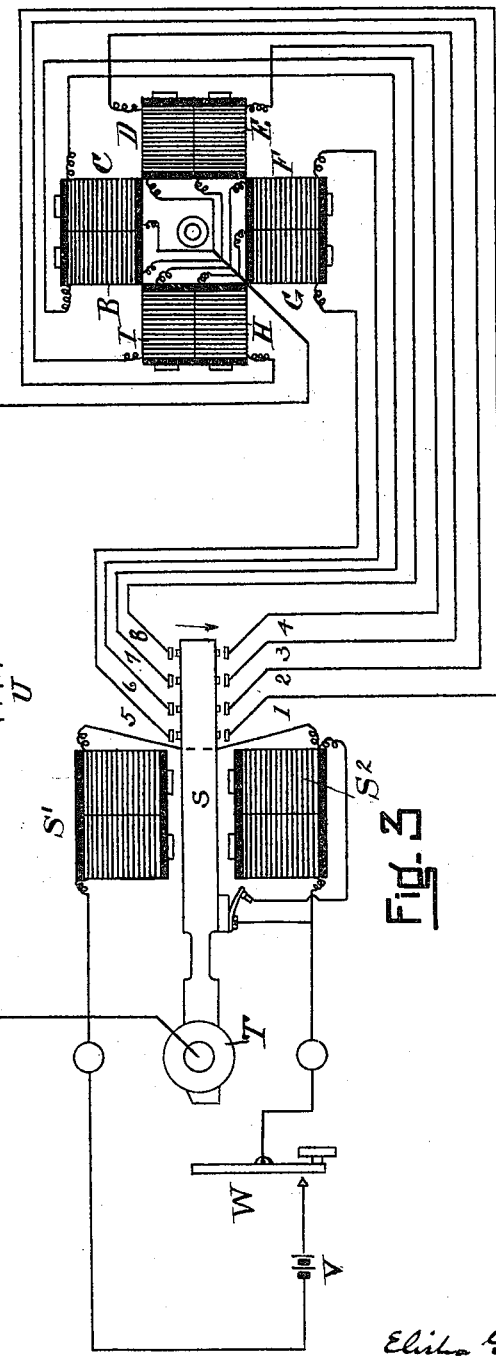
WITNESSES
INVENTORS

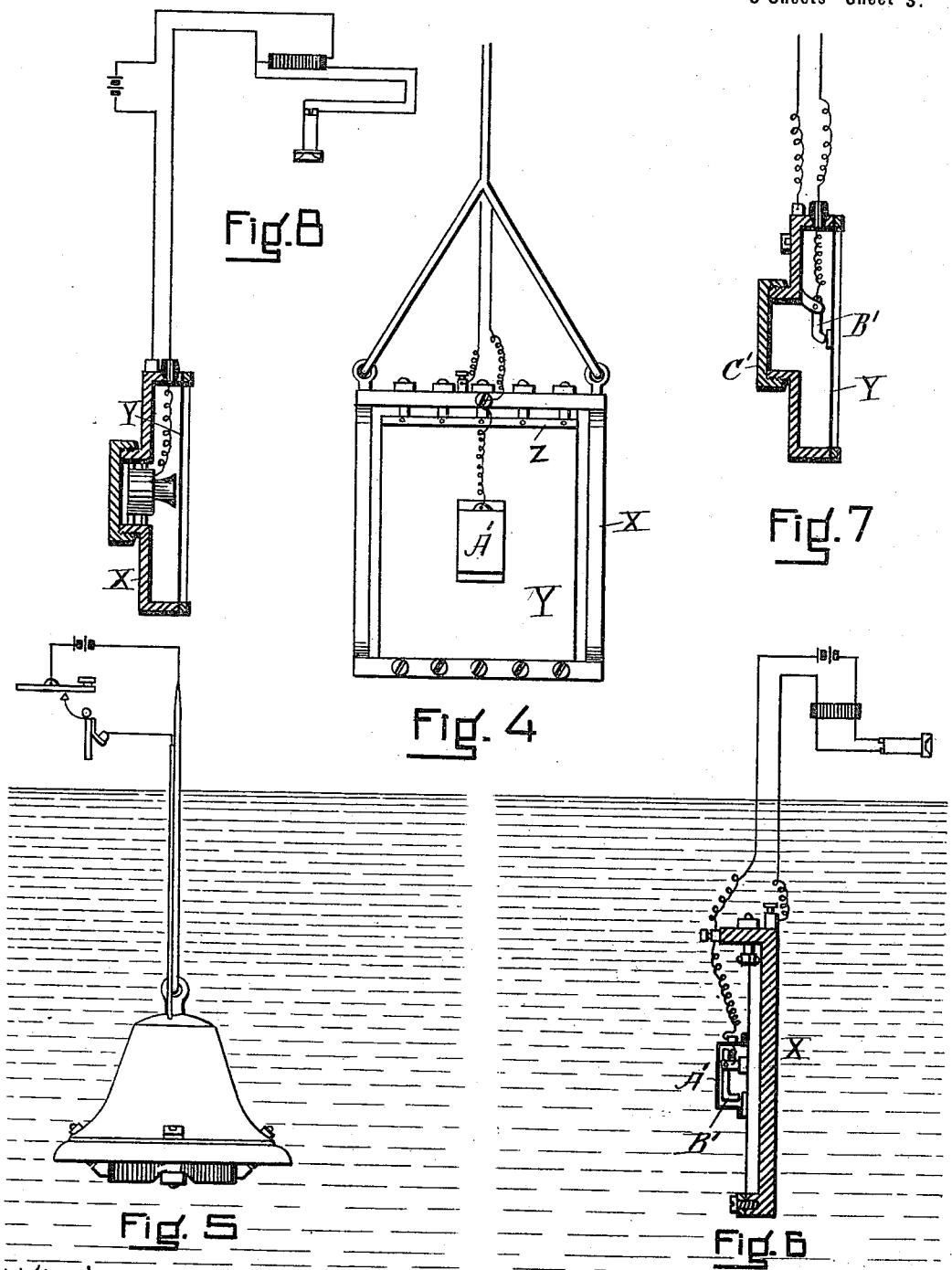

UNITED STATES PATENT OFFICE.

ELISHA GRAY, OF HIGHLAND PARK, ILLINOIS, AND ARTHUR J. MUNDY, OF NEWTON, MASSACHUSETTS.

TRANSMISSION OF SOUND.

SPECIFICATION forming part of Letters Patent No. 636,519, dated November 7, 1899.

Application filed April 14, 1899. Serial No. 713,037. (No model.)

*To all whom it may concern:*

Be it known that we, ELISHA GRAY, of Highland Park, in the county of Lake and State of Illinois, and ARTHUR J. MUNDY, of Newton, in the county of Middlesex and State of Massachusetts, have invented a new and useful Improvement in the Transmission of Sound, of which the following is a full, clear, and exact description, reference being had to the accompanying drawings, forming a part of this specification, in explaining its nature.

Our invention relates to a method of ringing or sounding a bell and also to a system and apparatus for transmitting intelligence between ships at sea and between the shore and any ship by means of sound-signals made in the water at the transmitting-station by electrical means. These sounds are picked up from the water at the receiving-station by means of electrical or mechanical devices. At present we prefer an electrical device, that will be hereinafter described.

Great difficulty is experienced in transmitting signals between ships at sea by the present methods. Visual signals are of no use in time of a fog, and sound-signals are not reliable because of the varying atmospheric conditions that are constantly going on. Sounds that may be heard for many miles under certain conditions of the atmosphere will be inaudible for one mile under certain other conditions.

Water is a homogeneous body and is not subject to the difficulties that are met with in the air, the conditions being the same at all times. Further, sound is transmitted through water at about four times the speed that it is through the air.

Sound-signals may be produced in the water by different methods; but we prefer in our system to use a bell that is rung electrically, but without mechanical impact—such, for instance, as is produced by the blow of a hammer.

By "bell" we desire to be understood as meaning the thing which has been defined as "an open percussion instrument varying in shape and material, but usually cup-like or globular and metallic, so constructed as to yield one dominant note;" but we do not use the bell in the way in which it was designed to be used, as we do not employ in producing its dominant tone the percussion of a hammer or tongue, so that by "ringing the bell" we do not mean to be understood as ringing it in the ordinary and known sense; still for convenience we shall continue to employ that phrase. The bell is rung by subjecting its rim to the direct action of magnetic lines of force created by electrical means and of a character to impart to the bell the rate of vibration of its dominant tone. We prefer to obtain this result by locating electromagnets adjacent to the rim, by mounting where necessary pole-pieces on the rim or sound-bow of the bell to coöperate with the electromagnets, and by providing the electromagnets with an energizing vibrating current of the rate of vibration of the dominant tone of the bell. While there may be employed for producing this result one electromagnet, for various reasons we prefer to employ magnets arranged in pairs, which pairs are diametrically opposed to each other with respect to the bell, and to also energize the sets alternately with vibrations or pulsations of the rate of the dominant tone of the bell for reasons hereinafter given. The bell thus employed is put to a new use, and the means for ringing it are also novel. The character of the sound produced establishes the fact that a new method of using the bell and ringing it and a new sound have been discovered. The sound which is thus obtained from the bell is of a peculiar nature and varies from sound before obtained from bells in that it is pure, being substantially free from overtones, in that it is or may be continuous with respect to volume for any desired interval of time, and in that it may be interrupted and immediately repeated without varying its volume or intensity. Our method, it may be said, has also this marked distinction from the ordinary ringing of the bell in that it selects and maintains the dominant tone of the bell freed from overtones or other tones calculated to muffle or destroy its character or carrying capacity. The new tone produced also has, because of its purity and because of its continuity, remarkable carrying effect, either in the water or in the air, which seems to be of a cumulative nature—that is, its insistence extends the sound-waves to continuously greater distances from their source for a limited period.

The method may be practiced in the air or in the water and at any depth and without any inclosure to the bell, the bell communicating directly to the water its sound-vibrations and for the period of such vibrations, and it is especially adapted because of this and because of the character of the sound for use as a means for originating sound-signals either in the air or in the water, and especially in the latter, and we have represented as a portion of our invention submerged sound-receiving devices which are adapted to take up and transmit the new sounds and which will hereinafter be more fully set forth.

Having described the object of our invention, we will now proceed to a description of the apparatus used in carrying it into operation.

Like letters and numerals of reference refer to like parts in the different figures.

Figure 2:
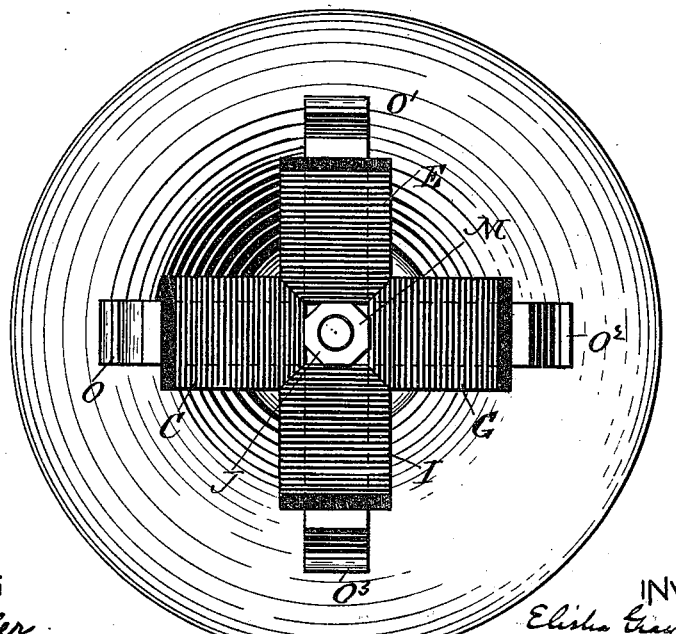

In the drawings, Figure 1 is a view in vertical section of a bell having mounted within it a system of electromagnets by means of which the bell is caused to ring. Fig. 2 is a view of the bell, looking into it, showing the relation of the magnets, their pole-pieces, and armatures to the bell itself. Fig. 3 is a plan view showing the connections between the magnets mounted in the bell and the apparatus for communicating the electrical impulses from a source of electricity to the bell. Fig. 4 is a front view of one form of an electrical receiving apparatus. It is intended to pick up the sounds from the water that may be transmitted to it from any distant point. Fig. 5 is an ideal sketch showing a bell immersed in the water with electrical connections running to a point above the water, which are connected with a battery, and an apparatus for transmitting impulses to the bell for the purpose of ringing it. Fig. 6 is an end view of the electrical receiver of Fig. 4, showing submerged and in operative relation to the bell of Fig. 5 the electrical connections with the point of interruption in the center of the receiving-diaphragm and the telephone-receiver above the water. Figs. 7 and 8 show two other forms of electrical receivers. Fig. 9 represents a view in section and plan of the vibrator and spring-contacts which connect it with wires hereinafter specified, showing the relation of these parts when the vibrator is at rest. Figs. 10 and 11 are similar views representing the relation of the vibrator to the springs when in action.

A is a bell, (shown in vertical section,) having mounted within it magnets B C D E F G H I. All of these magnets cannot be seen in one view. They are shown in their relation to each other in the plan view, Fig. 3. In Fig. 2 four of them are seen—viz., C E G I. Strictly speaking, there are only four magnets arranged at right angles to each other; but there are eight coils, one for each limb of each magnet, and these coils have independent connections by means of a cable to the transmitting apparatus above the water. The reason of this will be given hereinafter. The cores of these magnets are built up from laminations cut in the form of a cross from thin soft iron. The magnets are sustained by a strong steel support J, which passes through the crown of the bell and is held firmly by a screw threaded on the end of this support, which passes through and is held in place by a nut K, having an eye in it for convenience in the suspension of the bell. This support is held more firmly in position by means of the braces L L'. The lower end of the support J is also threaded and passes through the magnet-cores in the center of the cross, the magnets being held in place by means of a nut M. The two sets of magnet-cores are held apart and in their proper position by means of a washer N. The support J has a shoulder $m$ on it, so that when the nut M is turned up the two sets of magnets are clamped firmly together. In cases where the body of the bell is made of non-magnetic metal it is necessary to attach pole pieces or lugs to the bell in order that the magnets may be able to actuate it.

O O' O$^2$ O$^3$ are lugs of soft iron attached to the bell by means of bolts P, passing through the same and held in place by means of nuts Q. These lugs preferably are adjustable and may be arranged to slide back and forth for this purpose on the bolts P and are held in position by means of screws R or any other suitable device. These lugs should stand away from the poles of the magnets at a distance that will produce the best results, which is determined by experiment. In Fig. 3 a plan view is given, showing the circuits that connect the magnets of the bell with the vibrator which transmits the electrical impulses.

S, Fig. 3, is a tuned vibrator mounted securely to a post T, which is rigidly fastened to the base of the instrument. This vibrator is constructed and operated substantially the same as the reed shown in patent to applicant, Elisha Gray, No. 165,728, dated July 20, 1875. This vibrator is so tuned that its normal rate of vibration is the same as the dominant or fundamental note of the bell with which it is connected. If the vibrator is not in exact accord in its rate of vibration with that of the bell, no sound will be produced, although electric pulsations may be passing through the bell-magnets at their full power. When, however, the two are in accord, a full round musical tone will be produced in the bell with nearly, if not quite, all the overtones eliminated, such as are present in great numbers when the bell is struck with a hammer.

It has been determined by experiment that when a vibrator is vibrating against a spring-point at the rate of four hundred and twenty-six times per second only about one-half an ampere of electric current under a pressure of one hundred and ten volts will pass through it. This amount of current is not enough to ring a large bell weighing from one to five hundred pounds sufficiently loud. A means for overcoming this difficulty has been devised and is shown in Fig. 3. The wires 1 2 3 4 connect with the same number of springs so situated with relation to the vibrator S that when it is at rest the springs will be in slight contact with the points on the vibrator. In the drawings they are shown separated from the points, which is the appearance they have when the reed is in vibration.

By tracing the wires 1 2 3 4 it will be seen that No. 1 connects with magnet H, No. 2 with I, No. 3 with D, and No. 4 with E. Passing to the other side of the reed, wires 5 6 7 8 are similarly related to the vibrator by means of their respective springs, which connect in the same manner as heretofore described with the vibrator when at rest. Wires 5 6 7 8 connect with the magnets B C F G, which lie at right angles with the other set. When the vibrator is in action, it is only connected to one set of springs at a time. For instance, when it swings in the direction of the arrow at the end of the vibrator the four points belonging to the wires 1 2 3 4 are in contact with their respective springs and out of contact with the springs on the opposite side of the reed. This will cause electrical impulses to pass simultaneously through the wires 1 2 3 4 and their corresponding magnets H I D E. Inasmuch as each of these wires carries a half an ampere of current there will be an aggregate of two amperes passing through this set of magnets. When the vibrator swings to the opposite side, the second set of magnets B C F G are charged in the same manner because of the contact of the vibrator with wires 5 6 7 8. The first set of magnets will at the same time be discharged because they are out of electrical contact with the vibrator. The opposite ends of the wires of all the coils are joined together to one common return-wire 9, which connects with one pole of the source of electricity U, the other pole being connected with the vibrator.

A separate battery V may be used to actuate the vibrator S, it being well known, of course, that a branch of the same battery which operates the bell may be used also to operate the vibrator.

In order that signals may be produced rapidly, it is necessary that the bell should start and stop ringing with promptness. This is accomplished by causing the current passing through the bell-magnets to change from a vibratory character to a continuous current. There are several methods of accomplishing this, and we do not intend to confine ourselves to any one. One method is shown in Fig. 3, which accomplishes the result very satisfactorily. The vibrator S stops and starts very promptly by simply making and breaking the circuit, which actuates it by means of a key.

W, Fig. 3, is a key placed in the circuit of the battery V, which actuates the vibrator S. When the key is depressed, a circuit is established from the battery V through the vibrator-magnets $S'$ $S^2$, and the vibrator will then promptly vibrate and continue to do so until the key is let up again, when the vibrator promptly comes to rest. As heretofore explained, when the vibrator is at rest all of the eight springs connecting with the eight sections of the magnet are in contact with the reed; but when the vibrator is in vibration only four are in contact at a time. This, however, is accomplished so rapidly that to the eye all of the springs seem to stand away from the vibrator, as shown in the drawings. When it is desirable to send signals, which may be the long and short characters of the Morse alphabet, (or any other arbitrary signals that may be agreed upon,) the operation is as follows: Assuming that the bell and the vibrator are in exact accord as to their natural or fundamental rate of vibration, the bell will sound whenever the vibrator is put in vibration if connected with a suitable source of electricity. When the key W is closed, the vibrator is set in motion and the bell rings. When it is opened, the vibrator ceases to vibrate and all of the eight springs are in contact with the vibrator. This allows a powerful steady current to pass through all the magnets, which has the effect to immediately damp the bell, which otherwise would sound for many seconds of time before coming to rest. By this means, however, the cessation of sound is instantaneous, and from the fact that the bell is under a strain it more promptly starts up when the vibrator S is again put in vibration by depressing the key W. By this means sharp and strong signals may be rapidly produced, so that messages are transmitted with the same facility as by the ordinary Morse telegraph.

If we should take away one set of the springs connected with the reed—for instance, 5, 6, 7, and 8—the bell would still ring when the vibrator acted, but with only about half the power as when the full set of springs is in use. The reason for this may be explained as follows: When the vibrator is in contact with the springs 1 2 3 4, the magnets H I D E are energized, and the bell is drawn toward the poles of these magnets, causing it to assume an oval shape, which throws it away correspondingly from the poles of the magnets B C F G. When the vibrator swings away from the first set of springs, the magnets corresponding to them are deënergized and the magnets B C F G are energized at the same moment, causing the bell to be drawn in on a line at right angles with the direction that it was attracted by the first set of springs, thus giving the bell a double impulse, one on each half of its vibration. If it is desirable to get a greater amount of current into the bell, still other divisions may be made in the winding of the magnets and a greater number of spring-points added to the vibrator, or, if it is more convenient, two vibrators may be driven by the same controlling power, each operating in connection with a certain number of spring-points. We do not mean to limit ourselves to any definite number, but be governed by the necessity of each individual case.

The bell and magnets when used for submarine telegraphy may be submerged in the water in any desired way. With the construction in Fig. 1 it is simply necessary to suspend the bell in the water by means of its eye and a holding-chain.

The bell may be operated from a battery and operating devices placed at any desired distance from it.

It will be understood that for submarine purposes the bell will generally be of large size, varying from two hundred and fifty to two thousand five hundred pounds and upward in weight; also, that the magnets are of corresponding size and force and that the electric current employed must be sufficient to properly energize with one or more pulsating or vibrating currents the magnets, and we prefer to employ for the purpose of getting the largest results from the power used the construction represented in Fig. 3 or its equivalent.

It will be understood that the bell is sounded or rung by the vibratory action induced in it by the vibrating impulses of the magnets and that these vibrations may be continued in the magnets and consequently in the bell for an indefinite period and that the sound produced by the bell is very different in its tone and in its operative effect upon water in communicating signals from a sound which is the resultant of a single blow or even a succession of blows.

Having described the construction and operation of the bell and the manner of producing signals, we will now turn our attention to the receiving instrument.

Fig. 4 is one form of an electrotelephonic receiver. X is an iron frame having stretched within it a thin iron or steel diaphragm Y. This diaphragm is firmly secured to the bottom of the frame by means of screws and clamps, while at the top it is secured to the bar Z, to which are attached a number of bolts that project up through the upper part of the frame X and are threaded and provided with nuts by which the proper strain may be put upon the diaphragm.

A' is a small box placed upon the center of the diaphragm, which is fastened to it so as to be water-tight. This box is simply a protection for a circuit-breaker B', better shown in Fig. 6, which is an end view of Fig. 4. This circuit-breaker is simply a light lever which is electrically insulated from the diaphragm except at its point where the lever rests on the diaphragm. This lever is so made as to have a rate of vibration naturally slower than that of the diaphragm itself when vibrating under the influence of a sound coming to it from the transmitter. From this vibrating lever an insulated wire is connected which runs to a point above the water in which the receiver is immersed and connects there with an ordinary receiving-telephone. Another wire, which may or may not be insulated, connects with the diaphragm through the frame of the apparatus to the other side of the telephone-receiver. In this circuit is placed a small battery which is connected to the induction-coil of a telephonic receiver in the ordinary way. In order to get the best results from this receiver and to cause it to pick up sounds made in the water at the greatest possible distance, it should be tuned by means of the bolts and nuts at the top of the frame until its natural rate of vibration is in accord with the bell from which it is receiving signals. This is not necessary for ordinary distances, as a diaphragm will respond to all pitches of sound, but better to the one for which it is tuned, if it is tuned at all.

When in operation, the bell is lowered to any given depth in the water, which should be so far down as not to be interfered with by the waves. The receiver should be lowered into the water about the same distance. When a message is to be sent, for instance, between one ship and another, the bell is lowered into the water, if not already in that position, at the transmitting end, while the receiver will be in place at the receiving end on the other ship. Electrical signals are now transmitted to the bell in the manner that we have heretofore described. The sounds created by the bell will be transmitted through the water at a speed about four times as great as it would pass through the air. If a receiver is anywhere within the sphere of its influence, which will be many miles, more or less, according to the size and power of the bell, the sounds will be picked up by this receiver and reproduced in the receiving-telephone on board the ships, which may be read and written down in the same manner that an operator reads an ordinary Morse message. Of course each station is provided with both a transmitter and receiver.

Two other forms of receivers are shown in Figs. 7 and 8. These differ from the form just described in that the diaphragm is stretched across the end of a very short drum, which is made water-tight. The connection with the telephone above the water is precisely the same as that described for Fig. 4.

Fig. 7 shows a lever-contact with the diaphragm mounted in the same manner as in Fig. 4, except that there is no necessity for a box to protect it, as it is inside of a chamber. The chamber is provided with a cap C' for the purpose of opening up the chamber, if necessary. Fig. 8 is a chamber of the same construction, but instead of the lever resting upon the diaphragm an ordinary telephone-transmitter is placed within the drum and is actuated by the movement of the outer diaphragm moving the air within the inclosed drum, which in turn moves the diaphragm of the transmitter.

When a sound-wave passing through the water strikes the diaphragm of the receiver, it moves at a higher rate of speed than the lever naturally vibrates, and therefore causes it to jar at its point, which disturbs the electrical equilibrium of the circuit, causing a sound in the receiving-telephone. This is a more sensitive receiver than the ordinary speaking-telephone would be. It is not necessary for the reception of inarticulate sound-signals that the receiver be adjusted to take articulate sounds, but it is much more sensitive when constructed to receive a sound of a definite pitch. For short-range work, say within a radius of five miles, it is not necessary to construct the receiver to be thus sensitive.

The wires on shipboard or on shore may be carried to a quiet room on the inside, so that the operator will not be disturbed by extraneous sounds.

By the system and method herein described we are enabled to produce sounds or signals by means of a bell which have a special and valuable property as distinguished from a sound produced by a blow or succession of blows upon a bell in that the sound which is thus produced is of a sustained character, the duration of which may be varied at will. It is of special value as a means for producing signals in water to be communicated to and carried by water, because such sound vibrations so communicated to the water by the bell will be so sustained or continued and even cumulative in effect that they will have a greater carrying power in the water than sounds produced in the ordinary way, and when this is supplemented by employing in obtaining the sound vibrations of the rate necessary for producing the dominant tone or note of the bell the carrying effect of the sound in the water is further amplified and increased. Moreover, sustained sound vibrations or sounds thus produced when under such control as is afforded by the employment of electricity provide a very desirable means for communicating information or signals, because in the first place they can be so readily established or made by a key or other instrumentality and because their length may be infinitely varied and in any desired order.

While of course one magnet may be employed for sounding or ringing the bell, we prefer to use two magnets or a multiple of two and to arrange them back to back or in opposed relation to each other, so that the stress of one will be counteracted by the stress of the other and also so that they may simultaneously act upon sections of the bell diametrically opposed to each other. By so acting the body of the bell is held in equilibrium and does not require bracing against the pull of either magnet.

The arrangement represented in the drawings where the magnets are inside the cavity of the bell is therefore a very desirable one, although we would not be understood as limiting ourselves to this or any other special construction. With this construction, however, neither the bell nor the magnets require bracing with respect to each other, and the device will be operative if the bell is simply suspended.

When the bell is submerged, it is desirable to protect such parts as may be subjected to the influence of water by insulation and by copper-plating. For instance, the poles and the pole-pieces when used will be copper-plated.

The bell if of a copper alloy may or may not be copper-plated. The wire would of course be insulated.

While we have described the invention as especially useful for the purpose of communicating submarine signals, we would not be understood as limiting the method of ringing or sounding the bell to this use, as this portion of the invention may be used in sounding or ringing the bell under any conditions and in the air as well as in the water.

It will be understood that the electric vibrator makes contact with the wires 1 to 8 preferably by means of intermediate springs, which are when the vibrator is at rest in contact with it at both sides, but which when the vibrator is in motion have short periods when they are not in contact with it. This enables a longer contact to be established during each swing or movement of the vibrator with wires on each side thereof, so that a larger volume of electricity may pass through the wires because of this prolonged contact.

When magnets of the character specified are used, we prefer that the poles of the magnets and the pole-pieces be shaped and arranged with relation to each other, as represented in Fig. 1.

By our method the bell is rung by the direct action of magnetic lines of force, created by electrical means, without any mechanical contact whatever with the bell itself. These lines of force are propagated through the luminiferous ether across the air-gaps between the poles of the magnets and the armatures or lugs that are rigidly attached to the vibrating portions of the bell itself, thus forming a magnetic circuit. If the bell is made of a magnetic metal, then the lugs that are rigidly attached to the bell may or may not be used. If not used, the magnetic circuit is completed through that portion of the walls of the bell that lie opposite to the poles of the magnets. While it is possible to ring a steel bell without the use of lugs or armatures attached to it, we much prefer to use the latter because they can be constructed of iron laminations that will not heat when in action. It is found that solid iron or steel when used to form any part of the magnetic circuit will become intensely heated under the action of such powerful currents as we use in ringing a large bell. By the use of laminated cores in the magnets and armatures constructed in the same way this difficulty is entirely avoided. When the magnetic circuit is established, there is an attraction between the lugs (or walls of the bell, as the case may be) and the poles of the magnets. This partly closes the air-gap between the bell and the magnet-poles, but not enough to allow actual contact. We do not claim ringing a bell indirectly by electrical means, but we do claim ringing it directly by electrical means—that is to say, in the former case the hammer of the bell is actuated by electrical means; but the bell is as surely rung by mechanical impact between the hammer and the bell as it would be if the hammer were wielded by a man's arm or by any other power.

It will be seen that by our method of ringing a bell neither a hammer nor anything corresponding to it strikes the bell, and it makes no mechanical contact or impact with any substance other than the air or water (as the case may be) when it rings. It rings by a series of rythmical magnetic pulls propagated through the ether as lines of force. These pulls have a rate per second corresponding to the dominant note of the bell. It is a new art in bell ringing. The old method involves a blow with some sort of hammer against the bell which is actuated by some extraneous force. This blow causes not only the fundamental note of the bell to sound, but also all its overtones, producing a clang rather than a musical tone. These overtones are many of them discordant and tend to kill or reduce the power of the dominant tone, so that its carrying power is very much weakened. Our new method avoids all this. Employing, as we do, only magnetic lines of force to actuate the bell we are able to sound only the dominant tone, leaving the overtones quiescent. By this means a new result is obtained, enabling us to ring any bell much louder and with a purer quality of tone and one that possesses a far greater carrying power than is obtained by a bell rung in any of the old ways. Again, this new method enables us to ring a bell in places and in a manner that is not possible with the old methods. For instance, a sustained tone of full power can be maintained by our method for any length of time. This is not possible by the old method. This sustained tone may be chopped up into long and short sounds representing the Morse or any other code of signals. By our method the bell may be rung under water at any point or distance from the shore with the same ease as in the air. This is not possible by any of the old methods. Again, it is possible by our method to ring the bell very much louder without danger of breaking it than by the old method which depends upon a blow.

Having thus fully described our invention, we claim and desire to secure by Letters Patent of the United States—

1. In a bell, means for ringing the bell by the direct action of magnetic lines of force pulsated at the vibrational rate of the fundamental tone of the bell.

2. A system of submarine telegraphy comprising a submerged bell of the character specified for communicating signal vibrations or pulsations directly to the water and means for ringing the bell while submerged, by the direct action of magnetic lines of force pulsated at the vibrational rate of the fundamental tone of the bell.

3. A bell having two lugs or armatures of magnetic metal rigidly attached to its sound bow or rim and diametrically opposite each other, and two magnets having their poles in operative relation to said lugs or armatures, which magnets are energized by an electric current pulsated at the vibrational rate of the fundamental tone of the bell.

4. In a system of submarine telegraphy a submerged bell of the character specified and means for ringing it by the direct action of pulsating or vibrating magnetic lines of force electrically induced of the rate of vibration of the dominant tone of the bell.

5. In a system of submarine telegraphy a submerged bell of the character specified, means for ringing it by the direct action of vibrating or pulsating magnetic lines of force electrically induced having the rate of pulsation or vibration of the dominant tone of the bell, and means for varying the length of time of such pulsations or vibrations, as and for the purposes set forth.

6. A bell having two pairs of lugs or armatures made of magnetic metal rigidly attached to its sound bow or rim at the four quarters, a magnet opposite each lug or armature, having its poles in operative relation thereto and means for inducing by said magnets magnetic lines of force of the rate of vibration of the dominant tone of the bell.

7. A bell of the character specified submerged in water so that the water is in direct contact with its inside and outside surfaces and means for subjecting the bell so submerged to the direct action of magnetic lines of force pulsated at the vibrational rate of the fundamental tone of the bell.

8. In a system of submarine telegraphy, a bell of the character specified, means for ringing it by the direct action of magnetic lines of force pulsated at the vibrational rate of the fundamental tone of the bell, and a receiving instrumentality adapted to receive the pulsations or vibrations of the bell.

9. In a system of submarine telegraphy, a submerged bell of the character specified rung by the direct action of magnetic lines of force pulsated at the vibrational rate of the fundamental tone of the bell, and adapted to communicate its vibrations to the surrounding water, means for varying the length of time of the action of such magnetic lines of force upon the bell and a submerged receiving instrumentality adapted to receive the pulsations or vibrations of the water communicated to it by the bell.

10. In a system of submarine telegraphy a submerged bell of the character specified, means for ringing it by the direct action of magnetic lines of force electrically induced without the intervention of any form of percussion apparatus, and of a character to produce in the bell its dominant tone or note, means for varying the length of time of said action upon the bell, a submerged receiving instrumentality adapted to receive vibrations of the water communicated to it by the bell and means for conducting said vibrations from said receiver to a point more or less removed from it.

11. The combination of a bell of the character specified, bell-vibrating electromagnets arranged in proximity to the bell, whereby when energized the bell is subjected to the direct action of magnetic lines of force electrically induced without the intervention of any form of percussion apparatus, a source of electric energy connected with the magnets, and an electric vibrator for producing vibrations in the electric current of the fundamental tone of the bell, as and for the purposes set forth.

12. The combination of a bell, bell-vibrating electromagnets arranged in close proximity to the bell and diametrically opposed to each other connected with a source of electric energy and means for simultaneously energizing the said magnets to cause the points of the bell diametrically opposite the magnets to be simultaneously vibrated in opposed directions.

13. A bell, bell-vibrating electromagnets diametrically oppositely arranged with respect to each other, to directly act when energized to vibrate the bell, which magnets are connected with a source of electric energy and means for simultaneously energizing the said magnets at the vibrational rate of the fundamental tone of the bell.

14. A bell, bell-vibrating electromagnets to directly act, when energized, to vibrate the bell, connected with a source of electric energy, the said magnets being arranged in two pairs, the members of each pair being on the same radial line, and the lines crossing each other at a right angle, with a means for simultaneously vibrating each pair and for alternately vibrating the pairs.

15. A bell, bell-vibrating electromagnets to directly act, when energized, to vibrate the bell, connected with a source of electric energy and arranged in relation to the bell in groups of two, diametrically opposite each other, and an electric vibrator for producing vibrations in the electric current of the fundamental tone of the bell, adapted to induce similar vibrations in the bell-vibrating magnets, and means for alternately changing the vibrating current from one pair of magnets to the other.

16. A bell, bell-vibrating electromagnets to directly act, when energized, to vibrate the bell, the said electromagnets being arranged to simultaneously act upon the sections of the bell diametrically opposed to each other, and whereby the bell is prevented from being drawn bodily in one direction or the other.

17. A bell, a pair of bell-vibrating electromagnets to directly act, when energized, to vibrate the bell, connected with a source of electric energy, the said electromagnets being placed back to back within the bell, and being arranged to simultaneously act upon the sections of the bell diametrically opposed to each other, whereby the stress of one magnet is neutralized by the stress of the other, and whereby also the bell is maintained as a whole in stable position with respect to the magnets.

18. A bell, bell-vibrating electromagnets to directly act, when energized, to vibrate the bell, connected with a source of electric energy, an electric vibrator capable of producing vibrations in the electric current of the fundamental tone of the bell, and adapted to induce similar vibrations in the bell-vibrating magnets, and means for changing said vibrating current into a continuous current to cause the magnets to act to damp the bell.

19. A bell of the character specified, one or more bell-vibrating electromagnets in proximity to the bell to exert when energized magnetic force upon the bell to be vibrated, which magnets are connected with a source of electric energy and means for producing vibrations in the electric current, and magnet or magnets of the fundamental tone of the bell, whereby similar vibrations are established in the bell and means for initiating and varying the duration of said vibrations.

20. A submerged sound-receiver consisting of a diaphragm strained to a definite pitch or rate of vibration and so arranged that the water is in contact directly with both its sides.

21. The vibration-receiving instrumentality herein described submerged in water consisting of a diaphragm having both its surfaces in contact with the water, adapted to receive vibrations communicated to the water, a circuit-breaker having a natural rate of vibration slower than that of the diaphragm itself when vibrating, said breaker being electrically insulated excepting at a point resting against the diaphragm, a receiving-telephone and an electric circuit connecting it with the circuit-breaker and with the diaphragm.

22. The combination of a bell of the character specified, magnets suspended in the cavity of the bell opposite the sound bow or rim thereof, connected with a source of electric energy, and having their poles adjacent to the sound bow or rim of the bell, pole-pieces carried by said sound bow or rim of the bell arranged in operative relation to the poles of the said magnets, said magnets being energized by a pulsating current of the vibrational rate of the fundamental tone of the bell.

23. The combination of a bell of the character specified, four suspended magnets arranged with respect to each other and the bell as specified, and the pole-pieces O, O', O², O³ attached to the sound bow or rim of the bell and each in operative relation to the poles of one of the said magnets, as and for the purposes set forth.

24. The combination of the bell and the magnet-cores made of laminated metal in the form of a cross, the said magnet-cores being suspended by their center in the cavity of the bell, having their poles in operative relation to the bell.

25. The combination of a bell of the character specified, two pairs of diametrically-arranged bell-vibrating electromagnets arranged in proximity to the sound bow or rim of the bell and connected with a source of electric energy, an electrovibrator for producing vibrations in the electric current of the fundamental tone of the bell adapted to induce similar vibrations in the bell-vibrating magnets and means connecting one side of the vibrator with one of said pairs of magnets, and the other side of the vibrator with the other of said pairs of magnets, as and for the purposes set forth.

26. The combination of the bell of the character specified, bell-vibrating electromagnets in proximity to the sound bow or rim of the bell to cause when energized magnetic lines of force which act upon the bell to vibrate the same, a source of electric energy connected with the magnets, an electrovibrator capable of producing vibrations in the electric current of the fundamental tone of the bell and adapted to induce similar vibrations in the bell-vibrating magnets and means connecting each side of the vibrator with the magnets comprising yielding contact-points connected with the circuit-wires and arranged to be moved by the vibrator during its vibration, whereby a relatively long contact between the vibrator and contact-points is obtained, as and for the purposes set forth.

27. The combination of the bell, the bell-vibrating electromagnets B, C, D, E, F, G, H, I to directly act, when energized, to vibrate the bell, the battery U connected with the magnets, the vibrator S connected with the battery, the lines 1, 2, 3, 4, 5, 6, 7, 8 connected with the magnets as specified, and arranged upon each side of the vibrator as set forth, the vibrator, magnets and battery and the key W.

28. The combination of a bell of the character specified, bell-vibrating electromagnets arranged in proximity to the sound bow or rim of the bell and connected with a source of electric energy, an electrovibrator for producing vibrations in the electric current of the fundamental tone of the bell, adapted to induce similar vibrations in the bell-vibrating magnets, and separate or individual connections between the vibrator and the magnets, as and for the purposes set forth.

29. In a system of submarine telegraphy a submerged bell of the character specified, means for ringing it by the direct action of magnetic lines of force electrically induced without the intervention of any form of percussion apparatus and of a character to produce in the bell its dominant tone or note, means for varying the length of time of said action upon the bell, a submerged receiving instrumentality tuned to the dominant tone or note of the bell, adapted to receive vibrations of the water communicated to it by the bell, and means for conducting said vibrations from said receiver to a point more or less remote from it.

ELISHA GRAY.
ARTHUR J. MUNDY.

Witnesses:
F. F. RAYMOND, 2d,
J. M. DOLAN.